(12) United States Patent
Matsumoto

(10) Patent No.: US 8,741,490 B2
(45) Date of Patent: Jun. 3, 2014

(54) THICKENING AGENT FOR ALKALINE BATTERY, AND ALKALINE BATTERY

(75) Inventor: Yoshimasa Matsumoto, Kyoto (JP)

(73) Assignee: Sanyo Chemical Industries, Ltd., Kyoto-shi, Kyoto (JP)

( * ) Notice: Subject to any disclaimer, the term of this patent is extended or adjusted under 35 U.S.C. 154(b) by 353 days.

(21) Appl. No.: 13/124,055

(22) PCT Filed: Sep. 28, 2009

(86) PCT No.: PCT/JP2009/004906
§ 371 (c)(1),
(2), (4) Date: Apr. 13, 2011

(87) PCT Pub. No.: WO2010/050116
PCT Pub. Date: May 6, 2010

(65) Prior Publication Data
US 2011/0206995 A1     Aug. 25, 2011

(30) Foreign Application Priority Data

Oct. 27, 2008  (JP) ................. 2008-275966

(51) Int. Cl.
*H01M 6/22*  (2006.01)
(52) U.S. Cl.
USPC ....................................... 429/303
(58) Field of Classification Search
None
See application file for complete search history.

(56) References Cited

U.S. PATENT DOCUMENTS

| 6,667,133 | B1 | 12/2003 | Sumiya et al. | |
|---|---|---|---|---|
| 2007/0231703 | A1* | 10/2007 | Ohtani et al. | ............ 429/300 |

FOREIGN PATENT DOCUMENTS

| JP | 2000-306589 A | 11/2000 |
|---|---|---|
| JP | 2005-075982 A | 3/2005 |
| JP | 2008-034379 A | 2/2008 |
| WO | 2006-006471 A1 | 1/2006 |

OTHER PUBLICATIONS

International Search Report of PCT/JP2009/004906, mailing date Dec. 8, 2009.

* cited by examiner

*Primary Examiner* — Patrick Ryan
*Assistant Examiner* — Christopher Domone
(74) *Attorney, Agent, or Firm* — Westerman, Hattori, Daniels & Adrian, LLP

(57) ABSTRACT

Provided are a thickening agent for an alkaline battery, which can satisfactorily retain long-term discharge characteristics (discharge quantity and discharge time) and provide excellent impact resistance, and an alkaline battery used therewith. In the invention, the thickening agent for an alkaline battery comprises (A) a crosslinked polymer comprising, as essential constituent units, (a1) a water-soluble vinyl monomer and/or (a2) a vinyl monomer being converted into (a1) by hydrolysis, (b) a hydrolyzable crosslinking agent undergoing alkaline hydrolysis, and (c) a non-hydrolyzable crosslinking agent not undergoing alkaline hydrolysis, wherein (b) and (c) each has a content of 0.05% to 1% by weight based on the weight of (A), and satisfies Requirements (1) and (2) described below: Requirement (1): the weight ratio (b)/(c) between (b) and (c) is from 1.0 to 5.0; Requirement (2): a specific solution (S1) has a viscosity of 25 to 100 Pa·s at 25° C.

8 Claims, No Drawings

ＵＳ 8,741,490 B2

THICKENING AGENT FOR ALKALINE BATTERY, AND ALKALINE BATTERY

TECHNICAL FIELD

The invention relates to a thickening agent for an alkaline battery and to an alkaline battery. More specifically, the invention relates to a thickening agent for an anode (composed mainly of an alkaline electrolyte and a zinc powder) of an alkaline battery and to an alkaline battery used therewith.

BACKGROUND ART

Conventional anodes for alkaline batteries are produced mainly using a mixture of a high-concentration alkaline electrolyte (an aqueous high-concentration potassium hydroxide solution optionally containing zinc oxide or the like) and a zinc powder and/or a zinc alloy powder or the like. For the purpose of preventing precipitation of a zinc powder in an alkaline electrolyte, preventing batteries from leaking, and reducing stringy properties in view of increasing battery production efficiency, it is proposed that a water-absorbing resin or the like prepared by insolubilizing poly(meth)acrylic acid and salts thereof with a crosslinking agent should be added as a thickening agent to an anode (see Patent Document 1).

PRIOR ART DOCUMENT

Patent Document

Patent Document 1: Japanese Patent Application Laid-Open (JP-A) No. 2008-34379

SUMMARY OF THE INVENTION

Problems to be Solved by the Invention

In recent years, however, alkaline batteries have been required to have higher performance, and alkaline batteries produced with such a water-absorbing resin thickening agent are not always satisfactory in terms of retention of long-term discharge characteristics (discharge quantity and discharge time) and impact resistance, which are most important characteristics of alkaline batteries. In addition, due to the stringy properties of alkaline electrolytes, production efficiently cannot be increased satisfactorily.

It is therefore an object of the invention to provide a thickening agent for an alkaline battery, which can satisfactorily retain long-term discharge characteristics and provide excellent impact resistance, and to provide an alkaline battery used therewith.

Means for Solving the Problems

The thickening agent for an alkaline battery of the invention comprises (A) a crosslinked polymer comprising, as essential constituent units, (a1) a water-soluble vinyl monomer and/or (a2) a vinyl monomer being converted into (a1) by hydrolysis, (b) a hydrolyzable crosslinking agent undergoing alkaline hydrolysis, and (c) a non-hydrolyzable crosslinking agent not undergoing alkaline hydrolysis, wherein (b) and (c) each has a content of 0.05% to 1% by weight based on the weight of (A), and satisfies Requirements (1) and (2) described below:

Requirement (1): the weight ratio (b)/(c) between (b) and (c) is from 1.0 to 5.0;

Requirement (2): the solution (S1) described below has a viscosity of 25 to 100 Pa·s at 25° C.;

Solution (S1): a solution obtained by mixing 98 parts by weight of an aqueous 40% by weight potassium hydroxide solution and 2 parts by weight of the thickening agent for an alkaline battery and stirring the mixture to form a uniform solution and allowing the solution to stand at 25° C. for 24 hours.

Effect of the Invention

The thickening agent of the invention and the alkaline battery used therewith have the following advantages:

(i) alkaline batteries having very long discharge duration and excellent impact resistance can be prepared using a small amount of the thickening agent of the invention when it is used in alkaline batteries;

(ii) since variations in the charged amount of an electrolyte per battery are reduced, batteries of uniform quality can be produced even in mass production; and (iii) the use of the thickening agent of the invention makes it possible to charge an anode material uniformly at high speed even when small size batteries are produced, so that batteries of uniform quality can be produced.

MODE FOR CARRYING OUT THE INVENTION

As used herein, the term "water-soluble vinyl monomer" means a vinyl monomer having the property of being dissolved in an amount of at least 100 g in 100 g of water at 25° C. The term "hydrolyzable" means the property of undergoing hydrolysis by the action of water at 50° C. and optionally a catalyst (such as an acid or a base) to become water-soluble. The hydrolyzable vinyl monomer may be hydrolyzed during the polymerization, after the polymerization, or during and after the polymerization.

The water-soluble vinyl monomer (a1) and the vinyl monomer (a2) being converted into (a1) by hydrolysis are not particularly limited, and examples thereof include vinyl monomers described in JP-A No. 2005-075982.

Among these vinyl monomers, in view of discharge characteristics, anionic vinyl monomers are preferable, and secondly vinyl group-containing carboxylic acids (salts) of 3 to 30 carbon atoms, specifically, unsaturated monocarboxylic acids (salts) such as (meth)acrylic acid, crotonic acid, cinnamic acid, and salts thereof; and unsaturated dicarboxylic acids (salts) such as maleic acid, fumaric acid, citraconic acid, itaconic acid, and salts thereof are preferably exemplified. The vinyl monomer is more preferably an unsaturated monocarboxylic acid (salt), most preferably acrylic acid (salt).

The term "(meth)acrylic acid" means acrylic acid and/or methacrylic acid, and the term "acrylic acid (salt)" means "acrylic acid" and/or "acrylic acid salt."

Examples of the salt include alkali metal (such as lithium, sodium, and potassium) salts, alkaline earth metal (such as magnesium and calcium) salts, or ammonium ($NH_4$) salts. Among these salts, in view of discharge characteristics or the like, alkali metal salts and ammonium salts are preferred, alkali metal salts are more preferred, and in particular, sodium salts are preferred.

The water-soluble vinyl monomer (a1) contained in the crosslinked polymer (A) may be a non-neutralized form or a neutralized form (salt). In view of reducing the tackiness of the crosslinked polymer (A), improving the dispersibility of the crosslinked polymer (A) and improving the workability or the like for producing the crosslinked polymer (A), it is preferred that (a1) should be partially or entirely in a neutralized (salt) form.

When the water-soluble vinyl monomer (a1) contained in (A) is neutralized, for example, sodium hydroxide or an aqueous solution thereof may be added to the monomer phase before the polymerization or to the aqueous gel after the polymerization. The crosslinking agent (c) described below, which does not undergo alkaline hydrolysis, is less water-soluble. Therefore, if the polymerization is performed in such a state that the degree of neutralization of (a1) is high, (c) may separate from the aqueous monomer solution so that crosslinking cannot be performed as desired even when a specific amount of (c) is added. Therefore, a more preferred method includes polymerizing (a1) with a degree of neutralization of 0 to 30% by mole in the presence of (c) and then adding sodium hydroxide or an aqueous solution thereof to the aqueous gel as needed to control the degree of neutralization.

When an anionic vinyl monomer {such as acrylic acid (salt)} is used as (a1), the final degree of neutralization of the anionic vinyl monomer {the content (% by mole) of the anion base of the anionic vinyl monomer based on the total number of moles of the anion group and the anion base of the anionic vinyl monomer} is preferably from 30 to 100, more preferably from 40 to 90, in particular, preferably from 50 to 90. In the above range, the alkaline electrolyte can have further improved impact resistance and discharge characteristics. Here, the term "anion base" means a neutralized anion group.

(a1) and/or (a2) may be used singly to form a constituent unit, or two or more of (a1) and/or (a2) may be used to form constituent units.

When both of (a1) and (a2) are used to form constituent units, the molar ratio {(a1)/(a2)} between the vinyl monomer units is preferably from 75/25 to 99/1, more preferably from 85/15 to 98/2, most preferably from 90/10 to 95/5 in view of the discharge characteristics of alkaline batteries.

The crosslinked polymer (A) according to the invention has been crosslinked with crosslinking agents. The crosslinking agents to be used include a combination of the hydrolyzable crosslinking agent (b) undergoing alkaline hydrolysis and the non-hydrolyzable crosslinking agent (c) not undergoing alkaline hydrolysis.

The use of (b) in combination with (c) makes it possible to further enhance the viscosity stability of the thickening agent and to prevent syneresis of an alkaline electrolyte, so that discharge can be retained over a long period of time. The use of the combination also makes it possible to uniformly charge anode materials (an alkaline electrolyte, a zinc powder and the thickening agent) into a battery, so that imbalances in the injected amount of an electrolyte per battery can be preferably reduced.

Here, the term "syneresis of an alkaline electrolyte" refers to a phenomenon in which the thickening agent and the alkali electrolyte cannot maintain a substantially uniform mixed state and separate from each other.

Concerning (b), the term "undergoing alkaline hydrolysis" means that the unit derived from (b) has a hydrolyzable bond in the crosslinked polymer (A). In view of the viscosity stability of the thickening agent, the hydrolyzable bond derived from (b) is preferably decomposed by 50% by weight or more when 1% by weight of the thickening agent is added to an aqueous 40% by weight potassium hydroxide solution at room temperature and stirred for 1 hour.

The hydrolyzable bond may be a bond originally present in the molecule of the crosslinking agent (b) {in this case, the crosslinking agent is referred to as a crosslinking agent (b1) having a hydrolyzable bond in the molecule} or a hydrolyzable bond produced by crosslinking reaction of the crosslinking agent (b) with any other monomer(s) {(a1) and/or (a1)} constituting the crosslinked polymer (A) {in this case, the crosslinking agent is referred to as a crosslinking agent (b2) producing a hydrolyzable bond by the crosslinking reaction). Examples of the hydrolyzable bond include an ester bond and an amide bond.

Examples of (b1) include copolymerizable crosslinking agents having two to ten ethylenic unsaturated bonds in the molecule, such as N,N'-methylenebisacrylamide, ethylene glycol di(meth)acrylate, trimethylolpropane di(meth)acrylate, trimethylolpropane tri(meth)acrylate, pentaerythritol di(meth)acrylate, pentaerythritol tri(meth)acrylate, pentaerythritol tetra(meth)acrylate, and polyglycerin (degree of polymerization: 3 to 13) polyacrylate.

Examples of (b2) include reactive crosslinking agents reacting with carboxylic acids, such as polyglycidyl compounds (such as ethylene glycol diglycidyl ether), polyisocyanate compounds (such as 4,4'-diphenylmethane diisocyanate), polyamine compounds (such as ethylenediamine), and polyalcohol compounds (such as glycerin). The reactive crosslinking agents can react with (meth)acrylic acid (salt) to form an ester bond or an amide bond.

Among (b), in view of the viscosity stability of the thickening agent, N,N'-methylenebisacrylamide, ethylene glycol di(meth)acrylate, trimethylolpropane tri(meth)acrylate, pentaerythritol tri(meth)acrylate, and a polyglycidyl compound are preferable, N,N'-methylenebisacrylamide, ethylene glycol di(meth)acrylate, trimethylolpropane tri(meth)acrylate, and ethylene glycol diglycidyl ether are more preferable, N,N'-methylenebisacrylamide, trimethylolpropane tri(meth) acrylate, and ethylene glycol diglycidyl ether are particularly preferable.

When (b2) is used, the crosslinking reaction is generally allowed to proceed by heating preferably at 100 to 230° C., more preferably at 120 to 160° C. at any stage after the addition of (b2). Two or more of (b2) may be used in amounts within predetermined ranges, or (b2) may be used in combination with (b1).

The non-hydrolyzable crosslinking agent (c) not undergoing alkaline hydrolysis has no hydrolyzable bond in the molecule and cannot produce any hydrolyzable bond by crosslinking reaction. Examples of (c) include a crosslinking agent (c1) having two or more vinyl ether bonds and a crosslinking agent (c2) having two or more allyl ether bonds. In view of reactivity or the like, (c) is preferably (c2).

Examples of (c1) include ethylene glycol divinyl ether, 1,4-butanediol divinyl ether, 1,4-cyclohexanedimethanol divinyl ether, 1,6-hexanediol divinyl ether, polyethylene glycol divinyl ether (degree of polymerization: 2 to 5), bisphenol A divinyl ether, pentaerythritol trivinyl ether, sorbitol trivinyl ether, and polyglycerin (degree of polymerization: 3 to 13) polyvinyl ether.

Examples of (c2) include a crosslinking agent (c21) having two allyl groups and no hydroxyl group in the molecule, a crosslinking agent (c22) having two allyl groups and one to five hydroxyl groups in the molecule, a crosslinking agent (c23) having three to ten allyl groups and no hydroxyl group in the molecule, and a crosslinking agent (c24) having three to ten allyl groups and one to three hydroxyl groups in the molecule.

Examples of (c21) include diallyl ether, 1,4-cyclohexanedimethanol diallyl ether, alkylene (2 to 5 carbon atoms) glycol diallyl ether, and polyethylene glycol (weight average molecular weight: 100 to 4,000) diallyl ether.

Examples of (c22) include glycerin diallyl ether, trimethylolpropane diallyl ether, pentaerythritol diallyl ether, and polyglycerin (degree of polymerization: 2 to 5) diallyl ether.

Examples of (c23) include trimethylolpropane triallyl ether, glycerin triallyl ether, pentaerythritol tetraallyl ether, and tetraallyloxyethane.

Examples of (c24) include pentaerythritol triallyl ether, diglycerin triallyl ether, sorbitol triallyl ether, and polyglycerin (degree of polymerization: 3 to 13) polyallyl ether.

Two or more of (c) may be used in combination.

Among (c), (c2) is preferable, (c22) and (c24) are more preferable, (c22) is particularly preferable, trimethylolpropane diallyl ether and pentaerythritol diallyl ether are most preferable. These crosslinking agents are preferably used, because they are highly compatible with (a1) and (a2) and the crosslinking can be efficiently performed.

In the invention, the content of (b) in the crosslinked polymer (A) is from 0.05 to 1% by weight, based on the weight of (A). In view of prevention of syneresis of an alkaline electrolyte and long-term discharge characteristics, it is preferably from 0.1 to 0.8% by weight, in particular, preferably from 0.1 to 0.5% by weight.

The content of (c) in the crosslinked polymer (A) is from 0.05 to 1% by weight, based on the weight of (A). In view of long-term discharge characteristics, it is preferably from 0.05 to 0.5% by weight, in particular, preferably from 0.07 to 0.3% by weight.

The thickening agent for an alkaline battery of the invention satisfies Requirements (1) and (2) described below:

Requirement (1): the weight ratio (b)/(c) between the hydrolyzable crosslinking agent (b) and the non-hydrolyzable crosslinking agent (c) contained in the crosslinked polymer (A) is from 1.0 to 5.0;

Requirement (2): a gel (GA) of the composition described below has a viscosity of 25 to 100 Pa·s at 25° C.

Requirement (1) is necessary to enhance the impact resistance of batteries and to reduce imbalances in the injected amount of an electrolyte per battery in the process of injecting, into a battery at a high speed, an alkaline electrolyte containing the thickening agent. Requirement (2) is necessary to enhance discharge characteristics.

Concerning Requirement (1), the weight ratio (b)/(c) between (b) and (c) in (A) is from 1.0 to 5.0, and in view of prevention of viscosity changes with time and syneresis of an alkaline electrolyte, it is preferably from 1.2 to 4.5, more preferably from 1.3 to 4.0. If (b)/(c) is less than 1.0, syneresis of an alkaline electrolyte may occur, and if (b)/(c) is more than 5.0, the charged amount into a battery may significantly vary.

The total content of (b) and (c) is preferably from 0.1 to 2% by weight, more preferably from 0.15 to 1.3% by weight, in particular, preferably from 0.17 to 0.8% by weight, based on the weight of (A). When the total content is in such a range, the thickening agent can have enhanced stability, and an alkaline electrolyte containing the thickening agent can have further excellent long-term viscosity stability.

Concerning Requirement (2), the viscosity of the solution (S1) is from 25 to 100 Pa·s at 25° C., and in view of the discharge characteristics of an alkaline battery and high-speed filling of a battery with an electrolyte, it is preferably from 27 to 90 Pa·s, in particular, preferably from 30 to 80 Pa·s. If the viscosity is more than 100 Pa·s, high-speed filling of a battery with an electrolyte may be degraded, and if the viscosity is less than 25 Pa·s, the alkaline battery may have low discharge characteristics.

The solution (S1) is in the form of a gel that is obtained by mixing 98 parts by weight of an aqueous 40% by weight potassium hydroxide solution and 2 parts by weight of the thickening agent and stirring the mixture to form a uniform solution and allowing the solution to stand at 25° C. for 24 hours.

The viscosity of the solution (S1) is measured by the method described below.

<Viscosity Measurement Method>

The measurement is performed according to JIS 7117-1: 1999. A digital B-type viscometer (manufactured by TOKYO KEIKI INC.) is used to measure the viscosity of the solution (S1) at a measuring temperature of 25° C. with a rotor No. 4 at a rotational speed of 3 rpm.

The viscosity of the solution (S1) can be adjusted in the range satisfying Requirement (2) described above by increasing or decreasing the amount of (c). If the viscosity is high, the amount of (c) is increased, and if the viscosity is low, the amount of (c) is decreased.

In view of long-term discharge characteristics, the thickening agent for an alkaline battery of the invention preferably further satisfies Requirement (3) described below:

Requirement (3): the solution (S2) described below shows a syneresis rate of 10% by weight or less;

Solution (S2): a solution obtained by mixing 100 parts by weight of an aqueous 35% by weight potassium hydroxide solution, 2 parts by weight of the thickening agent for an alkaline battery, and 200 parts by weight of a zinc powder and stirring the mixture to form a uniform solution and allowing the solution to stand at 25° C. for 24 hours.

The thickening agent of the invention preferably shows a syneresis rate of 10% by weight or less, more preferably 9% by weight or less, in particular preferably 8% by weight or less, most preferably 7% by weight or less. When the syneresis rate is in such a range, further excellent long-term discharge characteristics can be obtained.

Here, the above-mentioned syneresis rate is measured by the method described below.

<Method for Measuring Syneresis Rate>

According to JIS K 7223-1996, a tea bag is made of a nylon screen with an aperture of 32 μm (400 mesh), and 75.0 g of the solution (S2) is placed to the bottom of the tea bag. After the tea bag is hung with a clip and allowed to stand for 30 minutes for draining, the weight (W1) (g) of the tea bag after the draining is measured. The same procedure is performed only with the tea bag not placing the solution (S2), and the weight (W2) (g) of the tea bag after the draining is measured. The syneresis rate is calculated from the following formula:

$$\text{syneresis rate}(\% \text{ by weight}) = [75.0 - (W1) + (W2)]/75.0$$

Next, a description is given of methods for producing the thickening agent of the invention.

Known polymerization methods such as any of solution polymerization, suspension polymerization, bulk polymerization, reverse phase suspension polymerization, or emulsion polymerization may be used to obtain the crosslinked polymer (A).

Among these polymerization methods, solution polymerization, reverse phase suspension polymerization, and emulsion polymerization are preferred, and in particular, solution polymerization and reverse phase suspension polymerization are preferred. These polymerization methods may be performed using known polymerization initiators, chain transfer agents, and/or solvents.

Most preferred are an aqueous solution polymerization method including adding and dissolving the crosslinking agent (b) and the crosslinking agent (c) to an aqueous monomer solution composed mainly of (meth)acrylic acid (salt) to form a solution and performing polymerization of the monomer; and a so-called reverse phase suspension polymerization method including dispersing or suspending the same aqueous monomer solution or the like in a hydrophobic organic solvent (such as hexane, toluene, or xylene) in the presence of a dispersing agent and performing polymerization of the monomer. These polymerization methods can produce a thickening agent with excellent discharge characteristics and impact resistance.

The method of polymerizing (meth)acrylic acid (salt) by an aqueous solution polymerization method or a reverse phase suspension polymerization method may be performed according to conventional methods such as methods in which polymerization is performed using a radical polymerization initiator or in which radioactive rays, ultraviolet rays, electron beams, or the like are applied.

When a radical polymerization initiator is used, examples of the initiator include an azo compound [such as azobisisovaleronitrile, azobisisobutyronitrile, 4,4'-azobis(4-cyanovaleric acid), 2,2'-azobis[2-methyl-N-(2-hydroxyethyl)propionamide, or 2,2'-azobis(2-amidinopropane)hydrochloride], an inorganic peroxide [such as hydrogen peroxide, potassium persulfate, ammonium persulfate, or sodium persulfate], an organic peroxide [such as di-tert-butylperoxide or cumene hydroperoxide], or a redox initiator [such as a combination of a reducing agent such as an alkali metal sulfite or bisulfite, ammonium sulfite, ammonium bisulfite, or L-ascorbic acid and a peroxide such as an alkali metal persulfate, ammonium persulfate, or hydrogen peroxide]. Two or more of these initiators may also be used in combination.

The polymerization temperature is preferably from −10° C. to 100° C., more preferably from −10° C. to 80° C. in view of an increase in the degree of polymerization of the polymer, while it depends on the type of the initiator used and the like.

In view of an increase in the degree of polymerization of the polymer, the amount of the initiator is not particularly limited, and it is preferably 0.000001 to 3.0% by weight, more preferably 0.000001 to 0.5% by weight, based on the total weight of (a1) and (a2).

In the case of aqueous solution polymerization, the concentration (% by weight) of the monomer to be polymerized is preferably from 10 to 40% by weight, more preferably from 10 to 30% by weight, while it varies with other polymerization conditions. If the concentration of (meth)acrylic acid (salt) to be polymerized is too high, the monomer itself may easily undergo pseudo-crosslinking (self-crosslinking) in parallel with the polymerization reaction, which may cause a reduction in the amount of absorption or in the average degree of polymerization of the polymer, or which may make the temperature control difficult during the polymerization or easily lead to a decrease in the average degree of polymerization of the polymer or an increase in oligomer components.

The amount of dissolved oxygen during the polymerization is preferably from 0 to 2 ppm, more preferably from 0 to 0.5 ppm, while it depends on the amount of the radical initiator added or the like. In these ranges, the crosslinked polymer (A) can be produced with a high degree of polymerization.

During the polymerization, the degree of neutralization of (meth)acrylic acid is not particularly limited, as long as predetermined amounts of the hydrolyzable crosslinking agent (b) and the non-hydrolyzable crosslinking agent (c) can be completely dissolved in the aqueous monomer solution, however, (c) is less water-soluble than (b) and particularly has very low solubility in an aqueous (meth)acrylic acid (salt) solution, and in some cases, even when a predetermined amount of (c) is added to the aqueous monomer solution, (c) separates from the monomer solution so that crosslinking cannot be performed as desired. Therefore, the degree of neutralization of (meth)acrylic acid should preferably be from 0 to 30% by mole when the polymerization is performed, and after the polymerization, the product should preferably be further neutralized if necessary, and more preferably, the polymerization should be performed in an unneutralized state, and after the polymerization, the product should be neutralized if necessary.

If (meth)acrylic acid is polymerized under the same conditions, the degree of polymerization can be more easily increased when the degree of neutralization is lower. Therefore, in order to increase the degree of polymerization of the polymer, the polymerization should preferably be performed at a low degree of neutralization.

The reverse phase suspension polymerization method includes dispersing or suspending an aqueous (meth)acrylic acid (salt) solution in a hydrophobic organic solvent typified by hexane, toluene, xylene or the like in the presence of a dispersing agent and performing polymerization of the monomer. In this polymerization method, the concentration of the monomer in the aqueous monomer solution is preferably from 10 to 40% by weight, more preferably from 10 to 30% by weight. In such a range, the crosslinked polymer (A) can be produced with a high degree of polymerization.

Examples of the dispersing agent include surfactants such as sorbitan fatty acid esters including sorbitan monostearate, glycerin fatty acid esters including glycerin monostearate, and sucrose fatty acid esters including sucrose distearate with an HLB (Hydrophile-Lipophile Balance) of 3 to 8; and polymer dispersing agents such as maleated ethylene/acrylic acid copolymers, maleated ethylene/vinyl acetate copolymers, and styrenesulfonic acid (salt)/styrene copolymers. Polymer dispersing agents are preferred, in view of making it easy to control the size of suspended particles of the aqueous monomer solution in a solvent and making it possible to prepare an aqueous gel of the crosslinked polymer (A) with the desired particle size.

In view of the discharge characteristics of alkaline batteries, the amount of the dispersing agent added is preferably from 0.1 to 20% by weight, more preferably from 0.5 to 10% by weight, based on the weight of the hydrophobic organic solvent.

In the reverse phase suspension polymerization, the weight ratio (W/O ratio) of the aqueous monomer solution to the hydrophobic organic solvent is preferably from 0.1 to 2.0, more preferably from 0.3 to 1.0. In these ranges, the particle size of the crosslinked polymer (A) can be controlled more easily.

The average degree of polymerization of a polymer that is produced under the same conditions as those used to produce the crosslinked polymer (A), except that no crosslinking agent is used, is preferably from 5,000 to 1,000,000, more preferably from 10,000 to 1,000,000.

When the polymerization is performed under conditions providing an average degree of polymerization of 5,000 or more, an aqueous high-concentration alkali solution containing the thickening agent prepared using an appropriate amount of the crosslinking agents can be prevented from decreasing in viscosity and/or from increasing in stringy properties. The above-described average degree of polymerization has been measured by gel permeation chromatography method (GPC method).

In the invention, the crosslinked polymer (A) obtained by the aqueous solution polymerization or the reverse phase suspension polymerization or the like is in the form of a water-containing gel (an aqueous gel). The aqueous gel is generally dried before used as a thickening agent.

In the case of the aqueous solution polymerization, a method for drying the aqueous gel includes fragmenting the aqueous gel to a certain extent (the level of the fragmentation is about 0.5 to 20 mm square) using a meat chopper or a cutter-type crusher or forming the aqueous gel into noodles, optionally adding alkali metal hydroxide or the like to neutralize the aqueous gel, and then performing ventilation drying (such as drying the aqueous gel laminated on a punching metal or a screen by forced ventilation of hot air at 50 to 150° C.), through-flow drying (a method including placing the aqueous gel in a vessel, allowing hot air to flow through or circulate, and drying the gel, while further fragmenting the gel using such a machine as a rotary kiln) or the like. Among them, the ventilation drying is preferred, because it can achieve efficient drying in a short time.

On the other hand, in the case of the reverse phase suspension polymerization, a method for drying the aqueous gel generally includes subjecting the aqueous gel obtained by the polymerization and the organic solvent to solid-liquid separation by such a method as decantation and then performing drying under reduced pressure (degree of pressure reduction; about 100 to about 50,000 Pa) or through-flow drying.

The drying temperature at which the aqueous gel is dried is preferably from 50 to 150° C., more preferably from 80 to 130° C., while it varies with the drying machine used, the drying time, or the like. The drying time is preferably from 5 to 300 minutes, more preferably from 5 to 120 minutes, while it also varies with the type of the drying machine used, the drying temperature, or the like.

If necessary, the dried product of the crosslinked polymer (A) obtained as described above may be ground into a powder. The grinding method may be a conventional method, for example, which may be performed using an impact grinder (such as a pin mill, a cutter mill, a Skirel mill, or an ACM pulverizer) or an air grinder (such as a jet grinder).

If necessary, the powdered crosslinked polymer (A) may be subjected to a process using a sieving machine having a desired screen (such as a vibrational sieving machine or a centrifugal sieving machine) so that a dry powder with a desired particle size can be collected. Here, in the invention, at any stage after the drying, a powder of a metal contaminant such as iron is preferably removed using a magnetic iron remover.

An alkaline battery in which the thickening agent of the invention is applicable for use as an alkaline electrolyte thickening agent is not particularly limited, and the thickening agent is applicable to any conventional alkaline battery such as LR-20 (D size alkaline battery) or LR-6 (AA size alkaline battery). In general, an alkaline battery has a structure including an exterior can and a cathode material, a collector rod, and an anode material which are sealed in the exterior can, in which the cathode material and the anode material are separated by a separator or the like.

Methods for charging the thickening agent of the invention into an alkaline battery include:

(a) a method that includes previously mixing the thickening agent of the invention with an alkaline electrolyte (such as an aqueous high-concentration potassium hydroxide solution optionally containing zinc oxide or the like), a zinc powder (and/or a zinc alloy powder), and optionally other additives to form an anode material mixture and charging the mixture into an anode vessel for a battery to form an anode; and (b) a method that includes charging the thickening agent of the invention and a zinc powder (and/or a zinc alloy powder) and optionally other additives into an anode vessel for a battery and then charging an alkaline electrolyte so that an anode can be formed in the vessel.

The method (a) is preferred, because the zinc powder can be uniformly dispersed in the anode vessel for a battery.

The amount of the thickening agent added is preferably from 0.5 to 10% by weight, more preferably from 1.0 to 5.0% by weight, based on the weight of the alkaline electrolyte, while it varies with the structure of the anode vessel, the particle size of the zinc powder, and the concentration of the alkaline electrolyte. When the amount added is in the above range, the alkaline electrolyte can have a suitable level of viscosity, which can prevent precipitation of the zinc powder and provide easy handleability.

Besides the crosslinked polymer (A), the thickening agent of the invention may optionally contain other additives as needed for the purpose of improving fluidity during the charging of the anode material, as long as there is no problem with workability or battery characteristics. Examples of the other additives include a gelling agent, a vibration/impact resistance enhancing agent, and a discharge characteristics enhancing agent.

Examples of the gelling agent include water-soluble resins such as CMC (carboxymethylcellulose), natural gum (such as guar gum), non-crosslinked poly(meth)acrylic acid (salt), slightly crosslinked poly(meth)acrylic acid (salt), and polyvinyl alcohol. Among them, slightly crosslinked poly(meth)acrylic acid (salt) or the like is preferred, because it can impart fluidity when the anode material is charged into the anode vessel.

The particle size of the gelling agent is not particularly limited, and it is 0.1 to 100 μm, more preferably 0.1 to 50 μm, in terms of dry weight average particle size.

Methods for adding the gelling agent include a method that includes previously dry blending the thickening agent of the invention with the gelling agent and then blending them with other anode materials such as a zinc powder and an alkaline electrolyte; a method that includes adding and mixing the gelling agent separately from the thickening agent of the invention in the process of preparing an anode material mixture; and a method that includes mixing an alkaline electrolyte with the gelling agent and then mixing the thickening agent of the invention and a zinc powder with them. Any of these methods may be used as long as a predetermined amount of any other thickening agent can be added as needed.

Examples of the vibration/impact resistance enhancing agent include an oxide, a hydroxide, a sulfide and the like of a metal element selected from the group consisting of titanium, indium, tin, and bismuth. Examples of the discharge characteristics enhancing agent include such known compounds as silicon dioxide and potassium silicate.

The contents of the other additives are preferably 5.0% by weight or less, more preferably 3.0% by weight or less, based on the weight of the alkaline electrolyte.

EXAMPLES

The invention will be further described hereinbelow by way of examples and comparative examples, but the invention is not limited thereto. Hereinbelow, unless otherwise stated, "%," "ultra-pure water," and "ion-exchanged water" means "% by weight," "water with an electrical conductivity of 0.06 μS/cm or less," and "water with an electrical conductivity of 1.0 μS/cm or less," respectively.

Example 1

To a 2-liter beaker were added 200 g of acrylic acid, 0.6 g of trimethylolpropane triacrylate (0.3% based on the amount of acrylic acid), 0.3 g of trimethylolpropane diallyl ether (0.15% based on the amount of acrylic acid), and 800 g of ion-exchanged water, and mixed by stirring to form an aqueous acrylic acid solution, which was cooled to 8° C.

The aqueous acrylic acid solution was poured into a 1.5-liter adiabatic polymerization vessel, and nitrogen was allowed to flow through the aqueous solution so that the amount of dissolved oxygen in the aqueous acrylic acid solution was made to be 0.1 ppm or less. To the adiabatic polymerization vessel were added 4.0 g of 0.1% hydrogen peroxide water, 4.0 g of an aqueous 0.1% L-ascorbic acid solution, 1.0 g of an aqueous 10% 2,2'-azobis(2-amidinopropane)hydrochloride solution (manufactured by Wako Pure Chemical Industries, Ltd., trade name: V-50), and the nitrogen flow into the aqueous solution was continued until polymerization was started. Polymerization was started, and after it was observed that the viscosity of the aqueous acrylic acid solution was beginning to increase, the nitrogen flow was stopped and polymerization was performed for 6 hours. The temperature of the aqueous acrylic solution was measured using a dotting thermometer. As a result, the maximum reached temperature was 63° C.

Here, a polymer was prepared by carrying out the above-mentioned polymerization under the same conditions, except that the above-mentioned two crosslinking agents were omitted. The average degree of polymerization of the resulting polymer was about 28,000 as measured by GPC.

The block-shaped crosslinked aqueous gel was taken out of the adiabatic polymerization vessel and fragmented into noodles with thicknesses of 3 to 10 mm using a small meat chopper (manufactured by Royal). Subsequently, 222 g (corresponding to acrylic acid with a degree of neutralization of 80% by mole) of an aqueous 40% sodium hydroxide solution (special grade reagent) was added to neutralize the aqueous gels.

The neutralized aqueous gels were laminated with a thickness of 5 cm on an SUS screen with an aperture of 850 μm and ventilated with hot air at 120° C. for 1 hour using a small ventilation dryer (manufactured by INOKIN Co., Ltd.) so that the aqueous gels were dried.

The dried product was ground using a cooking mixer, and particles with diameters of 32 to 500 μm (400 mesh to 30 mesh) were collected using sieves, so that a thickening agent (1) according to the invention was obtained.

Example 2

A thickening agent (2) according to the invention was obtained in the same manner as in Example 1, except that the amount of trimethylolpropane triacrylate was changed to 0.8 g (0.4% based on the amount of acrylic acid) and that the amount of trimethylolpropane diallyl ether was changed to 0.2 g (0.1% based on the amount of acrylic acid).

Example 3

A thickening agent (3) according to the invention was obtained in the same manner as in Example 1, except that the amount of trimethylolpropane triacrylate was changed to 0.5 g (0.25% based on the amount of acrylic acid) and that the amount of trimethylolpropane diallyl ether was changed to 0.4 g (0.2% based on the amount of acrylic acid).

Example 4

A thickening agent (4) according to the invention was obtained in the same manner as in Example 1, except that N,N'-methylenebisacrylamide was used in place of trimethylolpropane triacrylate and that the amount of trimethylolpropane diallyl ether was changed to 0.2 g (0.1% based on the amount of acrylic acid).

Example 5

A thickening agent (5) according to the invention was obtained in the same manner as in Example 1, except that 0.2 g of pentaerythritol diallyl ether (0.1% based on the amount of acrylic acid) was used in place of 0.3 g of trimethylolpropane diallyl ether (0.15% based on the amount of acrylic acid).

Example 6

A thickening agent (6) according to the invention was obtained in the same manner as in Example 5, except that ethylene glycol diglycidyl ether was used in place of trimethylolpropane triacrylate.

Example 7

A thickening agent (7) according to the invention was obtained in the same manner as in Example 1, except that 0.16 g of pentaerythritol triallyl ether (0.08% based on the amount of acrylic acid) was used in place of 0.3 g of trimethylolpropane diallyl ether (0.15% based on the amount of acrylic acid).

Example 8

A thickening agent (8) according to the invention was obtained in the same manner as in Example 1, except that the amount of trimethylolpropane triacrylate was changed to 0.45 g (0.23% based on the amount of acrylic acid) and that 0.1 g of tetraallyloxyethane (0.05% based on acrylic acid) was used in place of 0.3 g of trimethylolpropane diallyl ether (0.15% based on the amount of acrylic acid).

Comparative Example 1

Commercially available carboxymethylcellulose (CMC2450, manufactured by DAICEL CHEMICAL INDUSTRIES, LTD.) was used as a comparative thickening agent (H1).

Comparative Example 2

A comparative thickening agent (H2) was obtained in the same manner as in Example 1, except that the amount of trimethylolpropane triacrylate was changed to 0.6 g (0.3% based on the amount of acrylic acid) and that the amount of trimethylolpropane diallyl ether was changed to 0.04 g (0.02% based on the amount of acrylic acid).

Comparative Example 3

A comparative thickening agent (H3) was obtained in the same manner as in Example 1, except that trimethylolpropane triacrylate was not used and that the amount of trimethylolpropane diallyl ether was changed to 0.7 g (0.35% based on the amount of acrylic acid).

Comparative Example 4

A comparative thickening agent (H4) was obtained in the same manner as in Example 1, except that neither trimethylolpropane triacrylate nor trimethylolpropane diallyl ether was used.

The thickening agents (1) to (8) prepared in Examples 1 to 8 and the comparative thickening agents (H1) to (H4) prepared in Comparative Examples 1 to 4 were measured for the viscosity of the solution (S1) and the syneresis rate of the solution (S2) by the methods described above, respectively. The results are shown in Table 1.

TABLE 1

|  |  | Thickening agent | Weight ratio (b)/(c) between (b) and (c) | Viscosity (Pa·s) of solution (S1) | Syneresis rate (%) of solution (S2) |
|---|---|---|---|---|---|
| Examples | 1 | (1) | 2.0 | 40 | 3.2 |
|  | 2 | (2) | 4.0 | 35 | 3.8 |
|  | 3 | (3) | 1.3 | 27 | 6.5 |
|  | 4 | (4) | 3.0 | 40 | 3.5 |
|  | 5 | (5) | 3.0 | 50 | 3.4 |
|  | 6 | (6) | 3.0 | 60 | 2.4 |
|  | 7 | (7) | 3.8 | 30 | 7.9 |
|  | 8 | (8) | 4.5 | 27 | 4.8 |
| Comparative Examples | 1 | (H1) | — | 5 | 13.8 |
|  | 2 | (H2) | 15 | 10 | 7.2 |
|  | 3 | (H3) | 0.0 | 5 | 10.7 |
|  | 4 | (H5) | — | 10 | 15.6 |

[1] Precipitability of zinc powder, [2] injection time and variations in injected amounts, [3] battery duration, and [4] impact resistance were determined by the methods described below using the thickening agents (1) to (8) according to the invention and the comparative thickening agents (H1) to (H4). The results are shown in Table 2.

[1] Precipitability of Zinc Powder

To a biaxial kneader with a volume of 1 liter (manufactured by IRIE SHOKAI Co., Ltd., product name: PNV-1) were added 150 g of an aqueous 35% potassium hydroxide solution, 300 g of a zinc powder with a weight average particle size of 120 μm (manufactured by UNION MINIERE S.A., product name: 004F(2)/68), and 3.0 g of the thickening agent, and mixed at a rotational speed of 50 rpm for 60 minutes to form an anode material.

Fifty g of the prepared anode material was placed in a sealable sample vial with a volume of 50 ml (34 mm in diameter, 77 mm in height, made of polypropylene), and air bubbles, which were trapped during the mixing, were removed under reduced pressure.

After the sample vial was sealed and allowed to stand in a thermostatic chamber at 40° C. for 30 days, the sample vial was tapped 300 times from a height of 3 cm at a rate of 30 times/minute using a powder tester (manufactured by Hosokawa Micron Group) so that precipitation of the zinc powder was accelerated. After the tapping was completed, the maximum distance (mm) covered by the zinc powder precipitating from its initial position (the position of the upper end of the anode gel in the sample vial) was measured and determined as the precipitability (mm) of the zinc powder.

[2] Injection Time and Variations in Injected Amounts

An anode material prepared in the same manner as in [1] was transferred to a beaker, and air bubbles, which were trapped during the mixing, were removed under reduced pressure. The degassed anode material was sucked into a 0.1 ml-graduated, 20 ml syringe having an injection port with an inner diameter of 2 mm.

The anode material was injected into a 5 ml sample vial (18 mm in inner diameter, 40 mm in height) by pushing the syringe by 2.0 ml from the level of the opening of the vial. The time period (seconds) from the time when pushing the syringe was completed to the time when the anode material was completely released from the injection port of the syringe was measured using a stopwatch. The same procedure was repeated 20 times in total, and the average was used as the injection time (seconds).

The weight of the anode material injected into the sample vial was measured (each time 20 times), and the standard deviation (σ) of the injected amounts was calculated as variations in the injected amounts.

[3] Battery Duration

An anode material prepared in the same manner as in [1] was transferred to a beaker, and air bubbles, which were trapped during the mixing, were removed under reduced pressure. Fifteen g of the anode material was injected into an anode vessel for an LR-6 type model battery to form an anode, and a model battery was prepared.

Here, each constitutional material of the model battery, other than the anode, was made of the material described below. The shrink tube was made of polyethylene, and the cathode material was a composition comprising 50 parts by weight of electrolytic manganese dioxide, 5 parts by weight of acetylene black, and 1 part by weight of an aqueous 40% potassium hydroxide solution. The exterior can was made of a nickel-plated steel sheet, and the separator was made of polyolefin. The collector rod was made of a tin-plated brass rod, and the gasket was made of a polyolefin resin. The anode terminal plate was made of a nickel-plated steel sheet.

The prepared model battery was connected to a 2Ω external resistor at room temperature (20 to 25° C.) and continuously discharged. The time until the voltage decreased to 0.9 V was determined as the battery duration (hours).

After the model battery was prepared, the model battery was allowed to stand in a thermostatic chamber at 60° C. for 60 days. Subsequently, the same procedure was also performed on the model battery, and the battery duration was measured.

[4] Impact Resistance of Battery

While the model battery prepared in the same manner as described above and connected to a 2Ω external resistor at room temperature (20 to 25° C.) was continuously discharged, it was dropped from a height of 1 m onto a wood member continuously 10 times. The voltage before the first drop and the voltage immediately after the tenth drop were measured, and the impact resistance (%) was calculated from the following formula:

$$\text{impact resistance}(\%) = \{\text{the voltage}(V)\text{immediately after the tenth drop}/\text{the voltage}(V)\text{before the first drop}\} \times 100$$

After the model battery was prepared, the model battery was allowed to stand in a thermostatic chamber at 60° C. for 60 days. Subsequently, the same procedure was also performed on the model battery, and the impact resistance was determined.

TABLE 2

|  |  | Thickening agent | Precipitability (mm) of zinc powder | Injection time (seconds) | Variations σ in injected amounts | Duration (hr) | | Impact resistance (%) | |
| --- | --- | --- | --- | --- | --- | --- | --- | --- | --- |
|  |  |  |  |  |  | Immediately after preparation | After 60° C. × 60 days | Immediately after preparation | After 60° C. × 60 days |
| Examples | 1 | (1) | 2.5 | 0.2 | 0.02 | 20.2 | 19.6 | 96 | 94 |
|  | 2 | (2) | 3.2 | 0.2 | 0.02 | 20.0 | 19.3 | 96 | 93 |
|  | 3 | (3) | 3.5 | 0.1 | 0.02 | 19.7 | 19.2 | 94 | 91 |
|  | 4 | (4) | 2.5 | 0.1 | 0.02 | 19.8 | 19.2 | 95 | 92 |
|  | 5 | (5) | 1.7 | 0.2 | 0.02 | 20.1 | 19.4 | 96 | 92 |
|  | 6 | (6) | 1.9 | 0.2 | 0.02 | 19.8 | 19.2 | 96 | 92 |
|  | 7 | (7) | 4.1 | 0.1 | 0.02 | 19.8 | 19.2 | 94 | 90 |
|  | 8 | (8) | 3.5 | 0.1 | 0.02 | 19.7 | 19.1 | 95 | 89 |
| Comparative | 1 | (H1) | 50 | 4.5 | 0.25 | 12.2 | 10.8 | 15 | 8 |
| Examples | 2 | (H2) | 10 | 4.5 | 0.24 | 17.4 | 15.7 | 91 | 87 |
|  | 3 | (H3) | 5 | 1.0 | 0.09 | 18.7 | 17.6 | 87 | 84 |
|  | 4 | (H4) | 20 | 4.6 | 0.28 | 15.3 | 10.6 | 30 | 26 |

It is understood from the results in Table 2 that the thickening agents according to the invention are superior in all of the categories: precipitability of zinc powder, injection time, variations in injected amounts, battery duration immediately after preparation, battery duration after standing at 60° C. for 60 days, impact resistance of battery immediately after preparation, and impact resistance of battery after standing at 60° C. for 60 days.

That is, alkaline batteries used with the thickening agent of the invention have excellent impact resistance and excellent discharge characteristics retention.

INDUSTRIAL APPLICABILITY

The thickening agent of the invention is useful not only in cylindrical alkaline batteries but also in primary and secondary alkaline batteries such as alkaline button batteries, silver oxide batteries, nickel cadmium storage batteries, and nickel hydrogen storage batteries. Further, the alkaline battery used with the thickening agent of the invention is useful as an alkaline battery with excellent impact resistance, excellent discharge characteristics retention, and enhanced production efficiency due to excellent viscosity stability.

The invention claimed is:

1. A thickening agent for an alkaline battery, which comprises (A) a crosslinked polymer comprising, as essential constituent units, (a1) a water-soluble vinyl monomer and/or (a2) a vinyl monomer being converted into (a1) by hydrolysis, (b) a hydrolyzable crosslinking agent undergoing alkaline hydrolysis, and (c) a non-hydrolyzable crosslinking agent not undergoing alkaline hydrolysis, wherein (b) and (c) each has a content of 0.05% to 1% by weight based on the weight of (A), and which satisfies Requirements (1) to (3) described below:
Requirement (1): the weight ratio (b)/(c) between (b) and (c) is from 1.0 to 5.0;
Requirement (2): the solution (S1) described below has a viscosity of 25 to 100 Pa·s at 25° C.;
Solution (S1): a solution obtained by mixing 98 parts by weight of an aqueous 40% by weight potassium hydroxide solution and 2 parts by weight of the thickening agent for an alkaline battery and stirring the mixture to form a uniform solution and allowing the solution to stand at 25° C. for 24 hours,
Requirement (3): the solution (S2) described below shows a syneresis rate of 6.5% by weight or less;
Solution (S2): a solution obtained by mixing 100 parts by weight of an aqueous 35% by weight potassium hydroxide solution, 2 parts by weight of the thickening agent for an alkaline battery, and 200 parts by weight of a zinc powder and stirring the mixture to form a uniform solution and allowing the solution to stand at 25° C. for 24 hours.

2. The thickening agent for an alkaline battery according to claim 1, wherein (b) is a compound having an ester bond and/or an amide bond or a compound capable of forming an ester bond and/or an amide bond.

3. The thickening agent for an alkaline battery according to claim 1, wherein (b) is N,N'-methylenebisacrylamide, trimethylolpropane tri(meth)acrylate, or ethylene glycol diglycidyl ether.

4. The thickening agent for an alkaline battery according to claim 1, wherein (c) is a compound having two to ten allyl groups and one to five hydroxyl groups.

5. The thickening agent for an alkaline battery according to claim 1, wherein (c) is trimethylolpropane diallyl ether or pentaerythritol diallyl ether.

6. The thickening agent for an alkaline battery according to claim 1, wherein the crosslinked polymer (A) is a product obtained by solution polymerization or reverse phase suspension polymerization.

7. An alkaline battery, comprising the thickening agent for an alkaline battery according to claim 1 and a zinc powder.

8. The thickening agent for an alkaline battery according to claim 1, wherein
Requirement (1): the weight ratio (b)/(c) between (b) and (c) is from 1.3 to 4.5;
Requirement (2): the solution (S1) described below has a viscosity of 27 to 60 Pa·s at 25° C.;
Requirement (3): the solution (S2) shows a syneresis rate of 2.4% to 6.5% by weight or less.

* * * * *